(12) United States Patent
Lukens

(10) Patent No.: X8108
(45) Date of Patent: Mar. 26, 1834

(54) HULLING CLOVER SEED

(76) Inventor: William E. Lukens

William E. Lukens
Letters Patent

The Schedule referred to in these Letters Patent and making part
of the same containing a description in the words of the said William E.
Lukens himself of his improvement in the machine for hulling
clover seed.

Be it known that I William E Lukens of the County
of Harrison and State of Ohio have invented a new and useful
improvement in a machine for hulling clover seed and that
the following, is a full and exact description of the construction and
operation of the said machine as improved by me. The clover seed
[illegible] consists of six parts, viz 1st frame. 2nd cylinder. 3rd con-
cave. 4th cap. 5th hopper and 6th wind mill. 1st the frame is con-
structed of 4 posts about 2 feet 3 inches high: 2 caps about 4 feet
long. 2 girths about 3 feet long, exclusive of tenons: two planks
about 2 inches in thickness and 3 feet 2 inches in length and a-
bout 1 feet in width which are placed between the caps and the
girths to which the concave is fastened and which is raised and
lowered at pleasure by means of screw bolts; and 4 ties 2 feet 5 inches
long, exclusive of tenons: making a frame the extreme dimensions of
which are 3 feet 7 inches long: 3 feet 3 inches wide and 2 feet high
allowing the timbers to be 3½ inches by 3 inches. 2nd The follow-
ing size and construction of a cylinder is presumed to be the best
adapted to the application of a four horse power and consequent-
ly must be varied according to the power applied. Three wooden
heads or two cast rings and one wooden head are snugly wedged
on a bar of iron of suitable size say 1½ inch square on which are
pinned, if wood, and bolted and screwed if iron, as many staves
about an inch and a half thick and 2 feet 8 inches long, as will make
a cylinder about 9¼ in diameter. On each end of the axle is turned
a journal, which rests in metal bearings imbedded in the middle
of the caps of the frame and held down also by metal caps. The cyl-
inder inder is covered with sheets of cast iron about three eighths of an inch
in thickness and of such a width that 5 or 6 pieces will exactly cover
the cylinder The iron is cast in flutes or grooves about one eighth
of an inch deep nearly square on the fore side and sloping on the
other the slope extending to the verge of the next flute which makes
a sharp edge. These flutes run in a winding direction round the
cylinder so as to complete a revolution round it in the distance of 2 feet
6 inches the remaining two inches, they run in a contrary direction
The object of this is to prevent the seed from crowding in the end of the
cylinder The flutes are about half an inch wide, the cast iron
is all fastened by wood screws. On that end of the cylinder shaft
to which the power is applied, there is a pulley about 8 inches in
diameter which turns by a cross band working on a pulley of half
that diameter a seed roller in the hopper. On same end of the shaft
is also hung a balance wheel the size and construction of which
will be at the option of the builder it is presumed however that one 3
feet in diameter weighing 150 lbs. will be sufficient. On the other
end of the shaft is another pulley of eight inches which turns the
sand mill 3. The concave is made of three staves 2 feet 8
inches long and about 2 inches thick and of such a width that when
put together they will make half a circle. Each end of the mid-
dle stave or that one immediately under the cylinder is tenoned
in short tenons into the moveable concave plank spoken of in the
description of the frame. There are four pieces of wood about 2 inches
square and as long as the staves are wide, screwed on the outside
and at the ends of the other concave staves. in each of these pieces
are placed two screw bolts one running through the concave board
and the other through the cap. The mortises through which the
bolts pass are made sufficiently large to admit of the concave
being moved to or from the cylinder at pleasure. The whole forms
a concave which reaches to the centre of the cylinder on each side. On
the concave are placed sheets of cast iron. the same in thickness of
those on the cylinder and are cast of the same width of the staves to
which which they are secured by screws. The flutes are the same size and construction of those in the cylinder but run in a contrary direction that is when the cylinder and concave are in their proper places their flutes cross each other transversely. The flutes run in this direction four fifths of the length of the concave beginning at that end in which the seed is admitted from that to within about an inch of back end. They run lengthwise of the staves from thence to the end, they cross those of the cylinder again which completely prevents the seed from [illegible] in the end of the cylinder and conducts it all to the opening in the cap through which the seed escapes. The space between the cylinder and concave is from ½ to 3/8 of an inch at that end to which the power is applied and in which the seed is admitted and from half to an eighth of an inch at the opposite end. 4th The cap is made of as many staves as may be thought convenient about 20 inches long and about an inch and a half in thickness. These are formed into a concave completely smooth on the inside and of such a size as to cover the cylinder, leaving a space between them of about one fourth of an inch. The sides resting on those of the concave below. This leaves the cylinder bare about a foot from that end to which the power is applied for the admission of the seed and over which the hopper is placed. Over that end of the cap next to the hopper, is placed a rib of wood or iron to which the staves of the cap are firmly secured by screws. The ends of this rib project a little below the edges of the cap and are bolted to short ribs which are screwed to the outside of the concave staves which enables the concave to be shifted without moving the cap. The other end of the cap is tenoned about half an inch into a plank of suitable thickness and nailed from the outside into the end of the cap staves. The plank is held to its place by two long bolts reaching through the plank into the cap of the frame. In that side of the cap towards which the top of the cylinder moves on and within half half an inch of the end of the cylinder there is a mortise extending 3 inches lengthwise of the cap, and about 3½ inches crosswise. Through this opening the seed escapes when rubbed. 5th The hopper is a square box of inch plank half an inch wider than the diameter of the cylinder and extending in length from the end of the cap to the end of the cylinder and about 9½ in height. on the top of this there is placed another box about [illegible] inches high. in the shape and form of common hoppers. these two are united by screws and placed over the vacant end of the cylinder, its sides resting on the concave staves. The feed roller, which is about 3 or 4 inches in diameter and fluted on its surface and placed in the hopper extending across the inner side leaving a space between it and the cylinder of about half an inch. on the outside of the hopper on the shaft of the roller is a small pulley turned as above described. 6th The fans are turned by the pulley on the back end of the cylinder shaft. and will require about double the number of revolutions of the cylinder. The wind mill has a separate frame. and is set under the concave and receives the seed immediately into the riddle as it falls from the rubber. The windmill is constructed and the riddle and screen are shaken in the ordinary method. Operation. The seed after being threshed off the straw and well raked is thrown into the hopper. The cylinder is put into motion at the rate of [illegible] revolutions per minute. the screw like form of the flutes carries the seed under the cap and after passing several times between the rubbers, reaches the opening in the cap thro' which it escapes and falls into the riddle of the windmill; the unthrashed portion is blown off the seed runs through the riddle and screen and descends into a box below prepared for its reception. What I claim as my invention and improvement is the peculiar combination and arrangement of the several parts of the before described machine for cleaning clover seed. but I particularly claim the mode of preventing the seed from crowding in the end of the cylinder and of conducting it to the place of escape as before described.

Witnesses B. K. Morsell Wm E. [illegible]

[illegible] Elliott